(12) United States Patent
Jiang et al.

(10) Patent No.: US 9,312,957 B2
(45) Date of Patent: Apr. 12, 2016

(54) OPTICAL TRANSCEIVER DEVICE

(71) Applicant: Formerica Optoelectronics Inc., Hsinchu County (TW)

(72) Inventors: Sean Jiang, Hsinchu County (TW); Tung-Yi Yu, Hsinchu County (TW); Shan-Ju Yang, Hsinchu County (TW); Sheng-Wei Wu, Hsinchu County (TW); Shih-Chi Cheng, Hsinchu County (TW)

(73) Assignee: FORMERICA OPTOELECTRONICS INC., Hsinchu County (TW)

( * ) Notice: Subject to any disclaimer, the term of this patent is extended or adjusted under 35 U.S.C. 154(b) by 100 days.

(21) Appl. No.: 14/222,908

(22) Filed: Mar. 24, 2014

(65) Prior Publication Data

US 2014/0286636 A1 Sep. 25, 2014

(30) Foreign Application Priority Data

Mar. 25, 2013 (TW) .............................. 102110402 A (51) Int. Cl.
*G02B 6/36* (2006.01)
*H04B 10/40* (2013.01)
*G02B 6/42* (2006.01)
*H04J 14/00* (2006.01)
*G02B 6/43* (2006.01)

(52) U.S. Cl.
CPC .............. *H04B 10/40* (2013.01); *G02B 6/4246* (2013.01); *G02B 6/4292* (2013.01); *G02B 6/4278* (2013.01); *G02B 6/43* (2013.01); *H04J 14/00* (2013.01); *H04J 2203/0001* (2013.01); *H04J 2203/003* (2013.01); *H04J 2203/0023* (2013.01)

(58) Field of Classification Search
CPC .. G02B 6/4292; G02B 6/4246; G02B 6/4284; G02B 6/43; G02B 6/4278; H04B 10/40; H04J 2203/0053; H04J 2203/0001; H04J 2203/003; H04J 2203/0023

USPC ................... 385/53, 88–94; 398/135–139, 45
See application file for complete search history.

(56) References Cited

U.S. PATENT DOCUMENTS

| | | | | | |
|---|---|---|---|---|---|
| 4,761,832 | A | * | 8/1988 | Gade | G02B 6/3502 398/45 |
| 5,303,383 | A | * | 4/1994 | Neches | G01J 3/06 370/351 |
| 5,854,702 | A | * | 12/1998 | Ishikawa | H04B 10/40 398/137 |
| 6,527,456 | B1 | * | 3/2003 | Trezza | G02B 6/43 385/116 |
| 7,020,162 | B2 | * | 3/2006 | Iwasaki | H04Q 11/0062 370/395.41 |
| 7,796,892 | B2 | * | 9/2010 | Prater | H04B 10/40 398/115 |

(Continued)

*Primary Examiner* — Ryan Lepisto
*Assistant Examiner* — Guy Anderson
(74) *Attorney, Agent, or Firm* — Chun-Ming Shih (57) ABSTRACT

An optical transceiver device has an optical transceiver component, an O/E conversion substrate and a switch control substrate. The optical transceiver component is connected to the first, second optical fiber network equipments for the transmission of optical signal, respectively. The O/E conversion substrate is electrically connected to an in-line equipment at a first location for transmission of electrical signal, and may convert the received optical signal into the electrical signal or convert the received electrical signal into the optical signal. The switch control substrate is electrically connected with an optical switching switch and is connected with the in-line equipment at a second location to receive a control signal for the optical switch from the in-line equipment such that the optical switching switch operates at an normal mode or an bypass mode to guarantee normal network communication of the first, second optical network equipment.

9 Claims, 10 Drawing Sheets

(56) References Cited

U.S. PATENT DOCUMENTS

| | | | |
|---|---|---|---|
| 8,098,993 B2* | 1/2012 | Kirkpatrick | H04B 10/25752 398/135 |
| 2003/0065472 A1* | 4/2003 | Eckel | H05B 37/02 702/130 |
| 2005/0043907 A1* | 2/2005 | Eckel | G01K 1/045 702/62 |
| 2005/0105915 A1* | 5/2005 | Light | G02B 6/4292 398/164 |
| 2005/0232629 A1* | 10/2005 | Amemiya | H04Q 11/0005 398/45 |
| 2005/0286902 A1* | 12/2005 | Pierce | H04B 10/40 398/139 |
| 2006/0147217 A1* | 7/2006 | Hahin | H04B 10/40 398/135 |
| 2006/0165416 A1* | 7/2006 | Moursund | H04B 10/1125 398/135 |
| 2008/0062980 A1* | 3/2008 | Sunaga | G02B 6/4246 370/389 |
| 2008/0085117 A1* | 4/2008 | Farmer | H01J 14/0226 398/71 |
| 2011/0173315 A1* | 7/2011 | Aguren | H04L 63/20 709/224 |
| 2012/0082462 A1* | 4/2012 | Mariotti | H04B 10/40 398/135 |
| 2013/0177309 A1* | 7/2013 | El-Ahmadi | H04B 10/25 398/25 |
| 2013/0223848 A1* | 8/2013 | Yuda | H04B 10/40 398/135 |
| 2014/0205285 A1* | 7/2014 | Jiang | H04Q 1/00 398/45 |
| 2014/0241718 A1* | 8/2014 | Jiang | H04B 10/40 398/48 |

\* cited by examiner

OPTICAL TRANSCEIVER DEVICE

CROSS-REFERENCE TO RELATED APPLICATIONS

This application claims the priority of Republic of China Patent Application No. 102110402 filed on Mar. 25, 2013, in the State Intellectual Property Office of the R.O.C., the disclosure of which is incorporated herein by reference

BACKGROUND OF THE INVENTION

1. Field of the Invention

The invention relates to an optical transceiver device, particularly to an optical transceiver device transmitting electrical signal and control signal in different signal channels.

2. Descriptions of the Related Art

With the rapid development of network communication, the bandwidth and speed of network transmission keep on increasing. The conventional cooper cables used for signal delivery are replaced by optical cables gradually. Compared to conventional cooper cables, the optical cables not only are advantageous of small volume and EMI (electromagnetic interference) exemption, but also provide rapid and lots of signal transmission. Thus, the optical fiber network technology using optical cables as signal delivery media is widely applied to communication between various industries or equipments.

Because of convenience provided by networks, people rely more and more on networks. Therefore, a sudden network disconnection results in larger and larger loss for people. In an optical fiber network, an in-line equipment has to deliver signal by an optical transceiver device and an optical network equipment. The optical transceiver device is provided with an O/E converter. The O/E converter may convert electrical signal of the in-line equipment into optical signal and deliver to the optical network equipment, and may convert optical signal of the optical network equipment into electrical signal and send to the in-line equipment. As such, the communication between the in-line equipment and optical network equipment is accomplished. The in-line equipment normally needs to be arranged with one single optical transceiver device for normal connection to the optical fiber network. However, some in-line equipments, which are used to provide data filtering and/or flow control functions, need to be arranged with two optical transceiver devices for connection with two optical network equipments. As one of the optical transceiver devices receives optical signal from one of the two optical network equipments, only after passing through the in-line equipment can the optical signal be output to the other optical network equipment from the other optical transceiver device. As such, once said in-line equipment loses electrical power or is down, the signal transmission between the two optical network equipments would be enforced to stop and thus the disconnected network communication occurs.

As the in-line equipment connecting two optical transceiver devices as mentioned above runs abnormally, the two optical transceiver devices will usually be connected in a manual manner in order for the two optical network equipments to recover smooth network communication such that the damage due to network communication disconnection for users may be reduced. However, the manual manner cannot solve effectively the problem of unclear communication disconnection, which is a severe problem argued by general insiders, between optical network equipments because it is time consuming and prone to make errors.

In view of this, it is the problem that those skilled in the art are urgent to solve about how to provide an optical transceiver device to solve the problem of optical fiber network disconnection as the in-line equipment runs abnormally.

SUMMARY OF THE INVENTION

In view of various problems of prior arts mentioned above, mainly object of the invention is to provide an optical transceiver device to guarantee normal network communication between a first optical network equipment and a second optical network equipment on an optical fiber network.

Secondary object of the invention is to provide an optical transceiver device to configure separately an O/E converter unit and an optical switching switch on different substrates to reduce the chance with respect to redesign of the substrates in order to reduce the design cost of substrates.

Another object of the invention is to provide an optical transceiver device to configure an electrical signal port and a control signal port at different locations for transmission channels of control signal and electrical signal to be mutually separate in order for prevention of the control signal and the electrical signal from mutual interference in transmitting.

To achieve above object and other objects, an optical transceiver device of the invention is provided for connecting separately a first optical network equipment, a second optical network equipment and an in-line equipment to establish an optical fiber network, and guarantee normal network communication between the first, second optical network equipment. The optical transceiver device includes a device housing, an optical transceiving component, an O/E conversion substrate, an optical switching switch, and a switch control substrate. The optical transceiving component has a first optical transceiving port and a second optical transceiving port for connecting separately the first, second optical network equipment to perform delivery of optical signal. The O/E conversion substrate has an electrical signal port being exposed to a first location of the device housing for connecting electrically said in-line equipment for delivery of electrical signal. The O/E conversion substrate further has a first O/E converter unit and a second O/E converter unit, wherein the first, second O/E converter unit convert received optical signal into electrical signal, or convert received electrical signal into optical signal. The optical switching switch connects separately with the first, second optical transceiving port and first, second O/E converter unit. The switch control substrate connects electrically with the optical switching switch, having a control signal port, the control signal port being exposed to a second location of said device housing for connecting electrically the in-line equipment to receive the control signal of the in-line equipment for said optical switching switch, the switch control substrate causing running state of the optical switching switch to change according to the control signal for the first, second optical transceiving port to communicate separately with the optical signal of the first, second O/E converter unit; or for the optical signal of the first, second optical transceiving port to communicate in a situation without accessing the in-line equipment.

Preferably, the optical transceiver device of the invention further includes a carrying frame. The carrying frame is provided in said device housing to carry said optical switching switch and switch control substrate. The carrying frame is extended with a cantilever sheet, the cantilever sheet being extended to be below said optical switching switch to provide elastic support for the optical switching switch. The carrying frame further is formed with a guiding surface in order for guiding an optical fiber delivering optical signal inside said device housing to extend toward a determined direction. The optical transceiver device further includes multiple vibration absorbers provided separately on two end surfaces of said optical switching switch toward said cantilever sheet and a top cover of said device housing to absorb partial vibration energy of the optical switching switch.

Preferably, the O/E conversion substrate further may have a settling frame and a spring clip. The first, second O/E converter unit may enter the settling frame separately through the opening of two side walls of the settling frame. One side of the spring clip contacts said settling frame, the other side of the spring clip contacts the first O/E converter unit or second O/E converter unit in order to provide an clamping force for the first O/E converter unit or second O/E converter unit to abut the settling frame.

The switch control substrate may be further extended with a circuit flange plate in order to achieve the electrical connection between the switch control substrate and the optical switching switch. But, the connected electrically between the switch control substrate and the optical switching switch may further be achieved by a flexible circuit board or other electrical connection manners. Multiple blade stoppers may be protruded separately at different height locations on an inner wall of a device housing in order for abutting an O/E conversion substrate at different height locations such that, a fixate of the O/E conversion substrate is accomplished.

Preferably, the optical transceiver device further includes an indication lamp and an optical transceiving port socket. The indication lamp has a light emitting surface exposed to said device housing. The switch control substrate may be connected electrically with the light emitting element of the indication lamp through a circuit board, in order to provide electrical signal to adjust the brightness state of the indication lamp to indicate the running state of the optical switching switch and/or the first, second O/E converter unit by brightness. The indication lamp may comprise multiple light guiding pillars and light stoppers. one of the light stoppers is provided between adjacent light guiding pillars to block mutual interference of lights between adjacent light guiding pillars by the light stopper. The optical transceiving port socket is provided at the device housing, and the indication lamp abuts the optical transceiving port socket. The first, second optical transceiving port may penetrate and enter said optical transceiving port socket to accomplish fixation. The top cover of the device housing may abut the indication lamp to constrain longitudinal movement of the optical transceiving port socket by the indication lamp.

Moreover, the present invention further provide an optical transceiver device for connecting separately a first optical network equipment, a second optical network equipment, and an in-line equipment to establish an optical fiber network. The optical transceiving component has a first optical transceiving port and a second optical transceiving port for connecting separately the first, second optical network equipment to perform delivery of optical signal. The O/E conversion substrate has an electrical signal port, being exposed to a first location of the device housing for connecting electrically the in-line equipment for delivery of electrical signal. The O/E conversion substrate further has a first O/E converter unit and a second O/E converter unit, connecting separately the first, second optical transceiving port for converting received optical signal into electrical signal, or converting received electrical signal into optical signal. The indication lamp has a light emitting surface exposed to said device housing. The lamp control substrate is connected electrically with the indication lamp, having a control signal port exposed to a second location of the device housing, the control signal port provided for connecting electrically the in-line equipment to receive the control signal sent to the indication lamp by the in-line equipment in order to adjust brightness state of the indication lamp, thereby indicate the running state of the first, second O/E converter unit.

In comparison with prior arts, the optical switching switch provided by the invention may switch correspondingly running state of the optical switching switch according to the state of an in-line equipment, in order for the optical fiber network formed of the first and second optical network equipments to communicate normally such that the disconnection shortage of the optical fiber network due to electrical power loss or machine crash of the in-line equipment may be prevented. The transmission channels of control signal and electrical signal in the optical transceiver device of the invention are mutually separate in order to prevent different signal from mutual interference due to the generation of inductive effect that occurs as transmission is in the same channel. The O/E conversion substrate and a switch control substrate of the invention are arranged separately to not only reduce the chance of redesign for substrates, but also provide convenience for performance detection of the O/E converter unit and the optical switching switch.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of elements may be exaggerated for clarity, and the same reference numerals will be used throughout to designate the same or like components.

Figure 1:
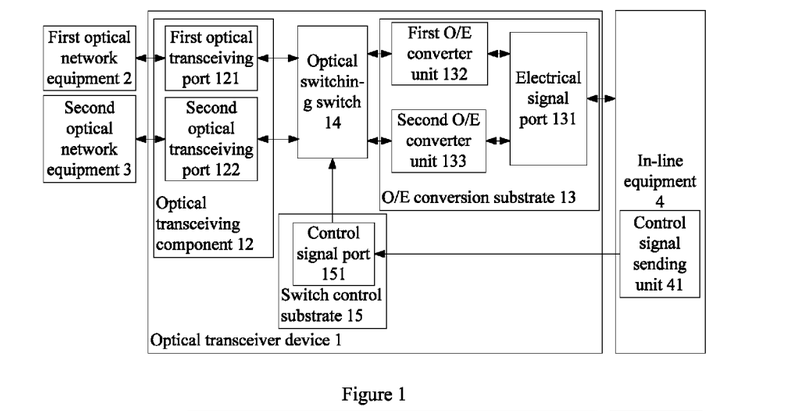
FIG. 1 is a circuit block diagram showing a first implementation of an optical transceiver device according to the invention.

Refer to FIG. 1, it is a circuit block diagram showing a first implementation of the optical transceiver device according to the invention. As shown in FIG. 1, the optical transceiver device 1 of the invention is used to connect separately a first, a second optical network equipment 2, 3 and an in-line equipment 4 to establish an optical fiber network for the in-line equipment 4 to be able to provide the first, second optical network equipment 2, 3 with functions such as, for example, data filtering and/or flow control etc. In addition, the optical transceiver device 1 may also execute a bypass mode to guarantee normal network communication preserved for the first and second optical network equipments 2, 3 as the in-line equipment 4 runs abnormally.

The optical transceiver device 1 of the invention mainly includes a device housing, an optical transceiving component 12, an O/E conversion substrate 13, an optical switching switch 14, and a switch control substrate 15. The optical transceiving component 12 has a connection structure of a first optical transceiving port 121 and a second optical transceiving port 122 for connecting separately the first, second optical network equipment 2, 3 to provide a delivery path of optical signal, such that the optical signal from the first, second optical network equipment 2, 3 may be received, or the optical signal inside the optical transceiver device 1 may be delivered separately to the first, second optical network equipment 2, 3.

The O/E conversion substrate 13 has an electrical signal port 131 exposed to a first location of the device housing 11 for plugging the in-line equipment 4 and connecting electrically with the in-line equipment 4 as a channel for electrical signal delivery between the optical transceiver device 1 and the in-line equipment 4. The O/E conversion substrate 13 further has a first O/E converter unit 132 and a second O/E converter unit 133. The first, second O/E converter unit 132, 133 may convert separately the optical signal received from the first, second optical transceiving port 121, 122 into electrical signal, or the electrical signal received from the in-line equipment 4 into optical signal. The first O/E converter unit 132 and the second O/E converter unit 133 are formed by, for example, a transmitter optical sub-assembly (TOSA) and a receiver optical sub-assembly (ROSA), or other O/E transceiving elements.

The optical switching switch 14 is connected separately with the first, second optical transceiving port 121, 122 and the first, second O/E converter unit 132, 133, and may provide a channel for optical signal delivery. The optical switching switch 14 of the invention may select various optical switch elements, such as Dual2×2 half duplex optical switch element, Dual2×2 full duplex optical switch element or 4×8optical switch element. The switch control substrate 15 is connected electrically with the optical switching switch 14 and has a control signal port 151. The control signal port 151 is exposed to a second location of the device housing 11 for plugging the in-line equipment 4 and connecting electrically with the in-line equipment 4 in order to receive control signal sent by the in-line equipment 4 to the optical switching switch 14 through a control signal sending unit 41. The switch control substrate 15 may, according to the control signal received by the control signal port 151, order the optical switching switch 14 to change running state, making the optical switching switch 14 running a normal mode, allowing the first, second optical transceiving port 121, 122 to communicate optical signal with the first, second O/E converter unit 132, 133 through the optical switching switch 14 separately; or order the optical switching switch 14 to run a bypass mode for mutual delivery of optical signal of the first, second optical transceiving port 121, 122 through the optical switching switch 14 without the in-line equipment 4 to implement delivery of optical signal between the first, second optical transceiving port 121, 122.

Here, it is noted that the optical switching switch 14 may be, for example, a locking optical switch element, and may also be, for example, a non-locking optical switch element. As the optical switching switch 14 is a non-locking optical switch element, when the above control signal sending unit 41 needs to send control signal carrying control instruction to the optical switching switch 14 through the control signal port 151, if the control signal and the electrical signal between the optical transceiver device 1 and the in-line equipment 4 are transmitted on the same or adjacent channels for long time, inductive effect will occur between the control signal and electrical signal to result in mutual interference and very large impact on signal transmission quality. Thus, in the optical transceiver device of the invention, the electrical signal port 131 and the control signal port 151 are configured in different locations, that is, the transmission channels of control signal and electrical signal are configured separately. As such, the inductive effect, which results in the problem with respect to mutual interference of signal, generated by transmission of different signal on the same or adjacent channels may be avoided.

Figure 11:
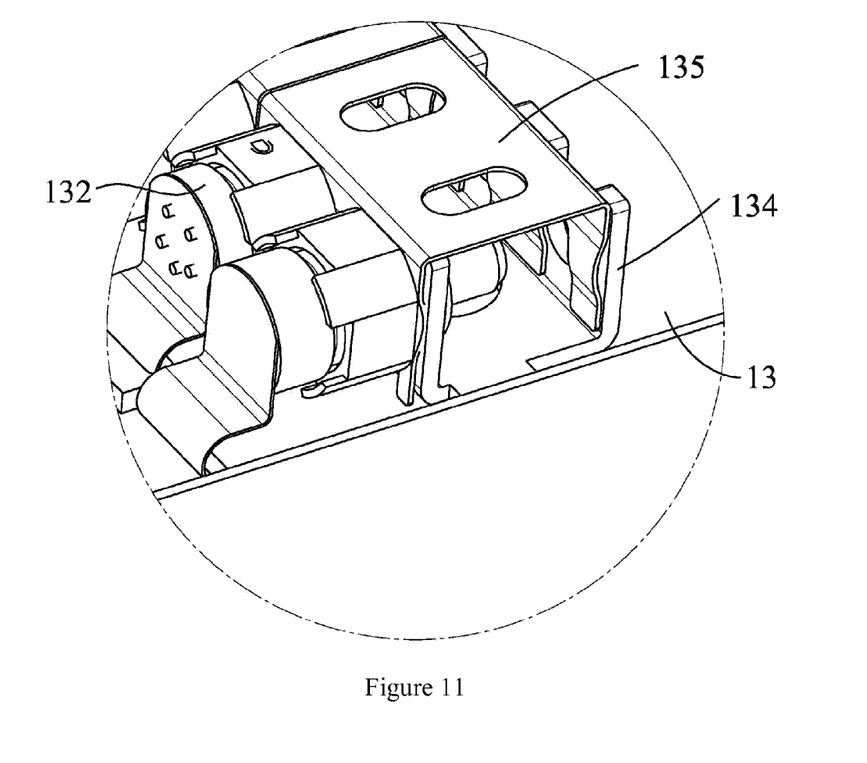
FIG. 11 is a partially enlarged view of the O/E conversion substrate according to the invention.
Figure 12:
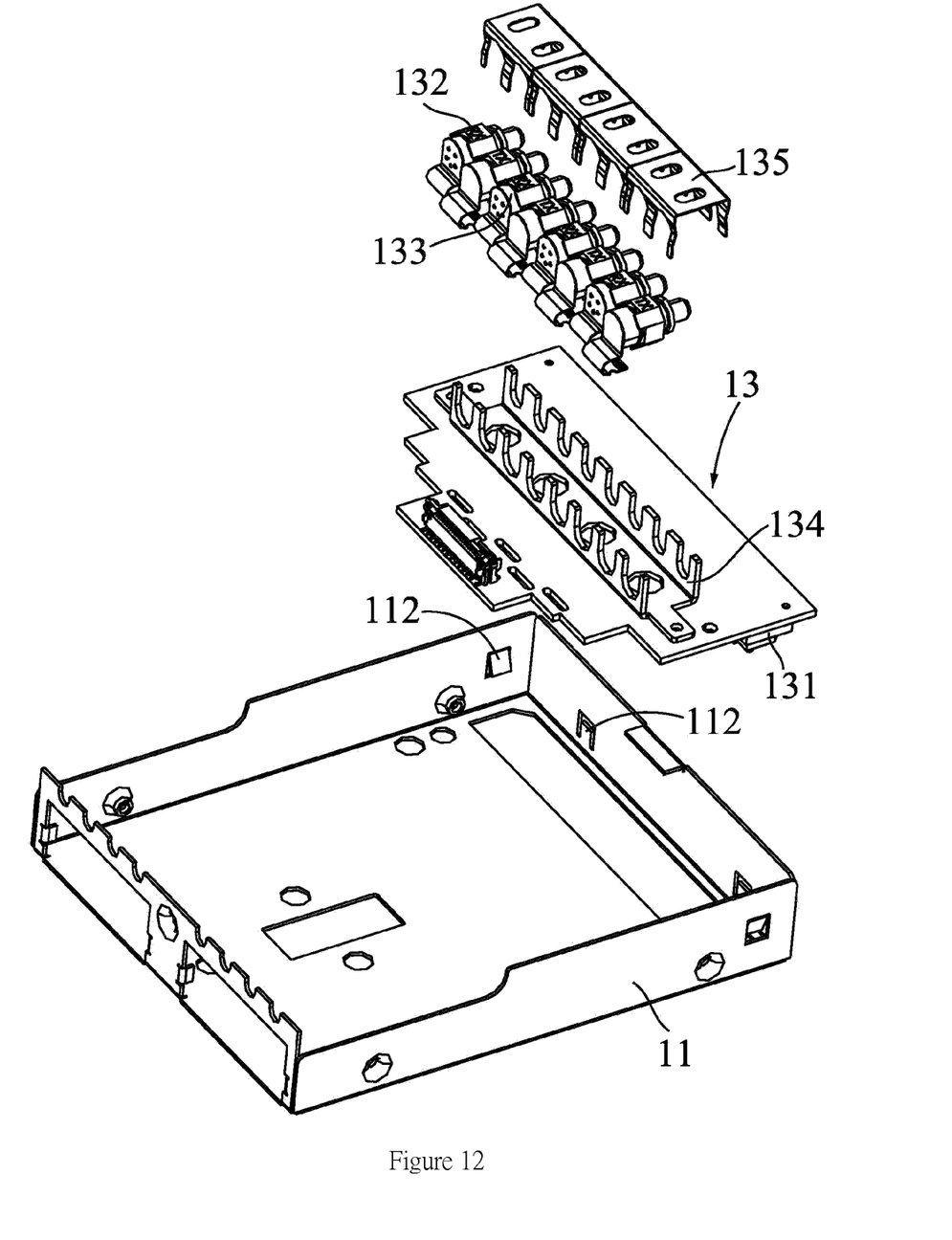
FIG. 12 is an exploded view of the O/E conversion substrate and device housing according to the invention.

As shown in FIG. 12, the O/E conversion substrate 13 further has a settling frame 134 and a spring clip 135. The first, second O/E converter unit 132, 133 may enter the settling frame 134 separately through openings of two side walls of the settling frame 134, and abut the two side walls of the settling frame 134. Further refer to FIG. 11, one side of the spring clip 135 may contact a wall of the settling frame 134, and the other side of the spring clip 135 may contact the first O/E converter unit 132 or second O/E converter unit 133 in order to provide clamping force for the first O/E converter unit 132 or the second O/E converter unit 133 to adjoin the settling frame 134.

The control manner and time of the in-line equipment 4 for the optical switching switch 14, and various operation modes of the optical switching switch 14 are exemplified as following:

As the in-line equipment 4 runs from abnormally (the abnormal running indicates that the in-line equipment 4 is down or loses electrical power) to normally, control signal may be sent to the optical switching switch 14 through the control signal sending unit 41 to order the optical switching switch 14 to run in the normal mode for the first, second optical transceiving port 121, 122 to communicate with the optical signal of the first, second O/E converter unit 132, 133 separately. At this moment, the optical signal of the first, second optical network equipment 2, 3 may be delivered separately to the first, second O/E converter unit 132, 133 through the first, second optical transceiving port 121, 122, the optical switching switch 14 in order, and thereby is converted into corresponding electrical signal for the in-line equipment 4 to process. It is noted additionally that the first, second O/E converter unit 132, 133 may also convert the electrical signal provided by the in-line equipment 4 into corresponding optical signal, and deliver to the first, second optical network equipment 2, 3 through the optical switching switch 14, the first, second optical transceiving port 121, 122 in order.

Moreover, as the in-line equipment 4 runs from normally to abnormally, the optical switching switch 14 may run in the bypass mode. In executing bypass mode, the optical switching switch 14 will disconnect the communication of optical signal between the first, second optical transceiving port 121, 122 and the first, second O/E converter unit 132, 133 for the first, second optical transceiving port 121, 122 to communicate with each other and transmit optical signal mutually to form an optical bypass effect. Thus, although the in-line equipment 4 stops operation, the optical signal of the first, second optical network equipment 2, 3 may still deliver with each other through the first, second optical transceiving port 121, 122 to guarantee normal network communication between the first and the second optical network equipments 2, 3 as the in-line equipment 4 is abnormal.

Figure 2:
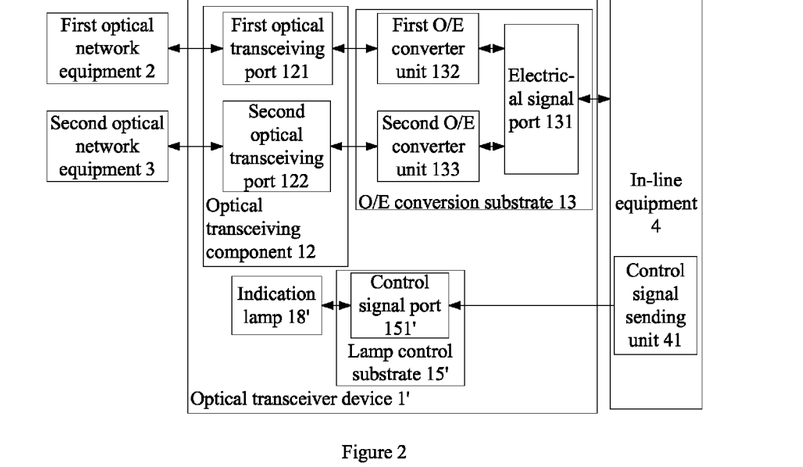
FIG. 2 is a circuit block diagram showing a second implementation of the optical transceiver device according to the invention.

Refer to FIG. 2, which is a circuit block diagram showing a second implementation of the optical transceiver device according to the invention. Wherein, the same or like elements as the optical transceiver device of the above implementation (as shown in FIG. 1) are indicated by the same or like element numerals, and the description thereof are omitted in order for clearer understanding of the application.

The largest difference between the optical transceiver device 1' of the second implementation and the optical transceiver device 1 of the first implementation is in that, the optical transceiver device 1' of the second implementation omits the configuration of the optical switching switch 14 and the switch control substrate 15, and is provided with an indication lamp 18' and a lamp control substrate 15'.

The indication lamp 18' has a light emitting surface exposed to a device housing; while the lamp control substrate 15' is connected electrically with the indication lamp 18'. The lamp control substrate 15' has a control signal port 151' exposed to a second location of the device housing. A control signal port 151' is provided for connecting electrically the in-line equipment 4 to receive the control signal sent to the indication lamp 18' by the control signal sending unit 41 of the in-line equipment 4 in order to adjust brightness state of the indication lamp 18', thereby indicate the running state of the first, second O/E converter unit 132, 133 for users to master the running state of the O/E converter units in the optical transceiver device V.

It is understood from the disclosure of the above second implementation that the optical switching switch and switch control substrate are not necessary elements in the optical transceiver device of the invention.

Figure 3:
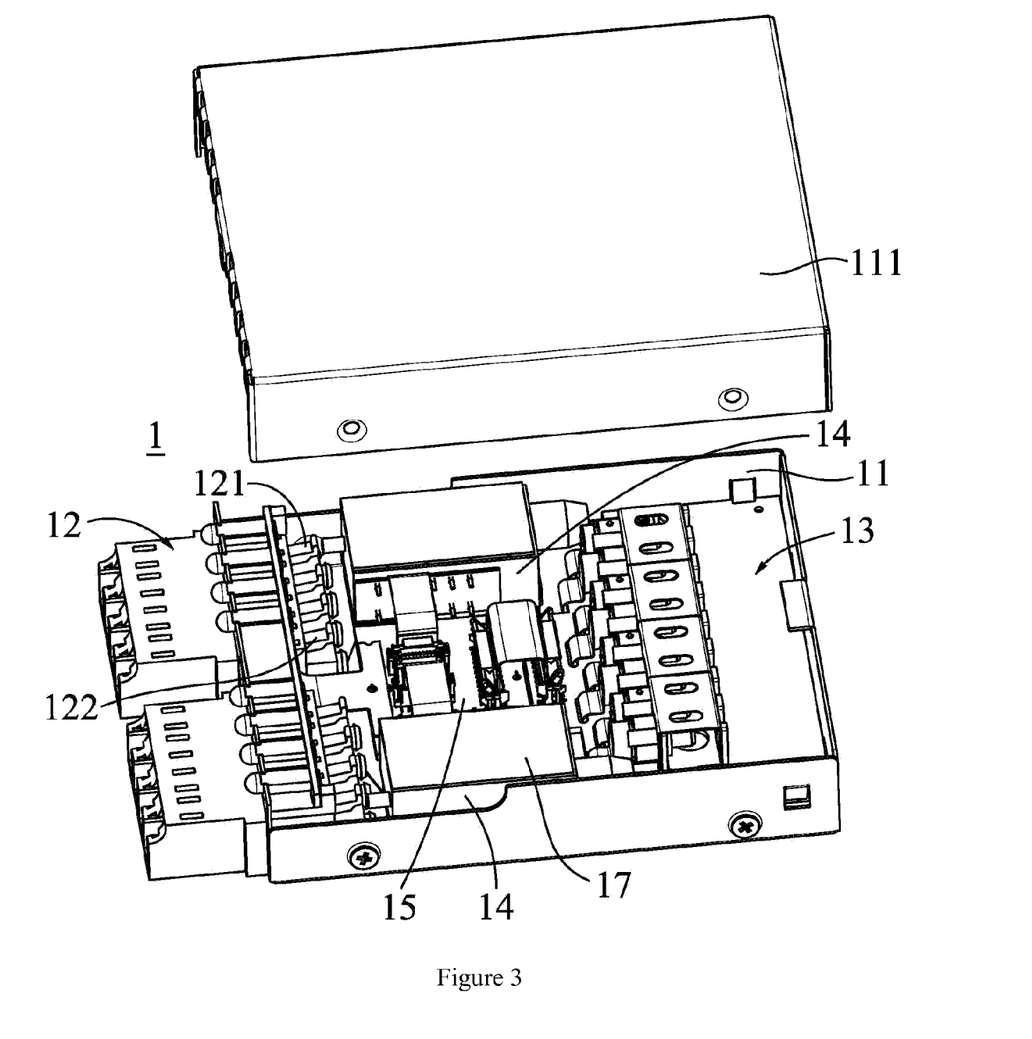
FIG. 3 is a structural exploded view showing the first implementation of the optical transceiver device according to the invention.
Figure 4:
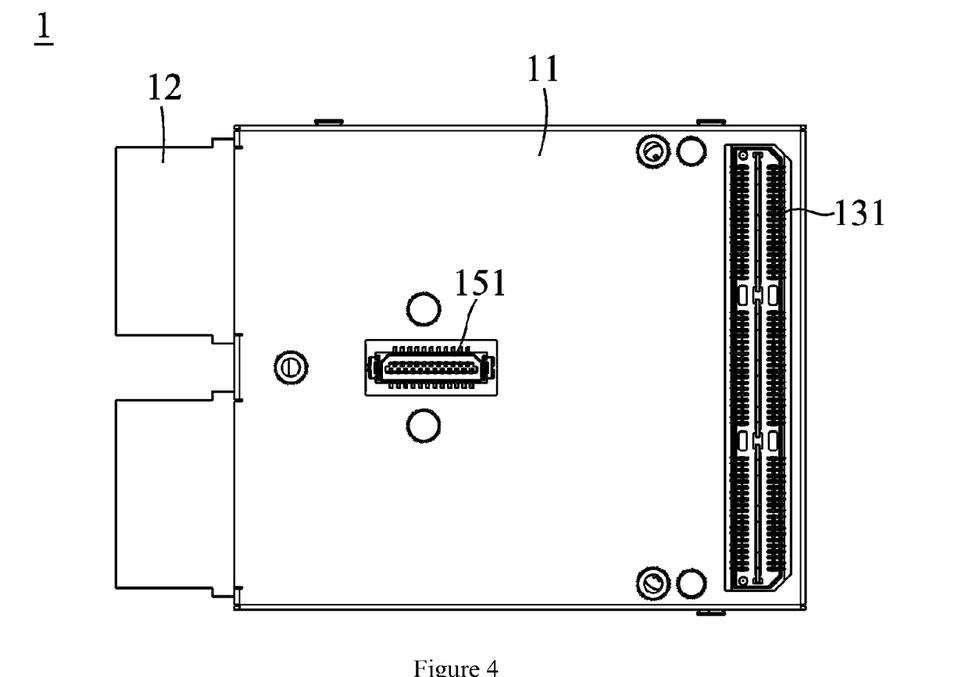
FIG. 4 is a bottom view showing the first implementation of the optical transceiver device according to the invention.

Further refer to FIGS. 3 to 14 together, which are structural views showing the first implementation of the optical transceiver device according to the invention. As shown in the figures, a device housing 11 has a containing space for containing an O/E conversion substrate 13, an optical switching switch 14 and a switch control substrate 15. The device housing 11 further has a top cover 111. The top cover 111 covers an open side of the containing space in the device housing 11 in order to protect electronic elements contained in the device housing 11. As shown in FIG. 4, the electrical signal port 131, control signal port 151 are exposed separately to a first, second locations on a back side wall of the device housing 11, and may be plugged to the in-line equipment at different locations. But, the electrical signal port 131, control signal port 151 may still be exposed to walls on other sides of the device housing 11, instead of limited to the location feature disclosed in FIG. 4.

Figure 5:
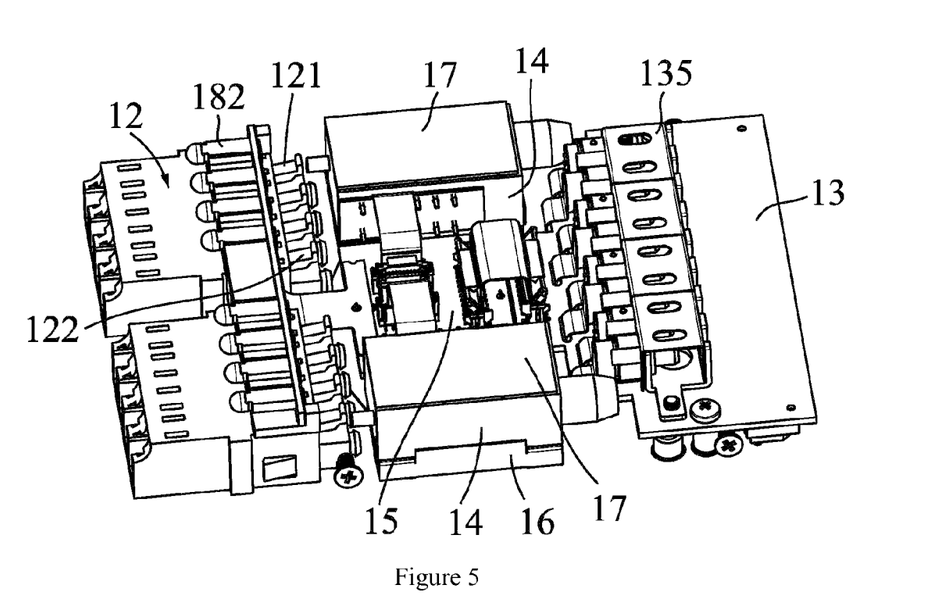
FIG. 5 is a schematic view showing the optical transceiver device of FIG. 3 with device housing omitted.
Figure 6:
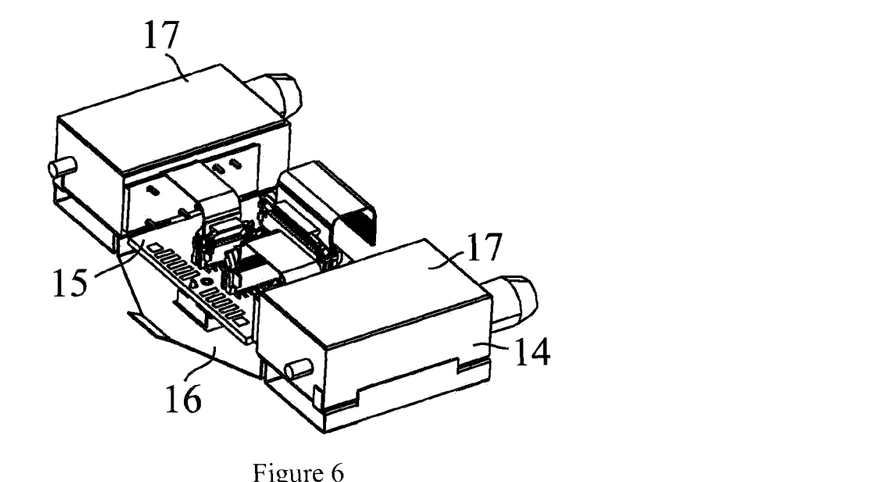
FIG. 6 is an assembly drawing of partial members in the optical transceiver device illustrated in FIG. 5.
Figure 7:
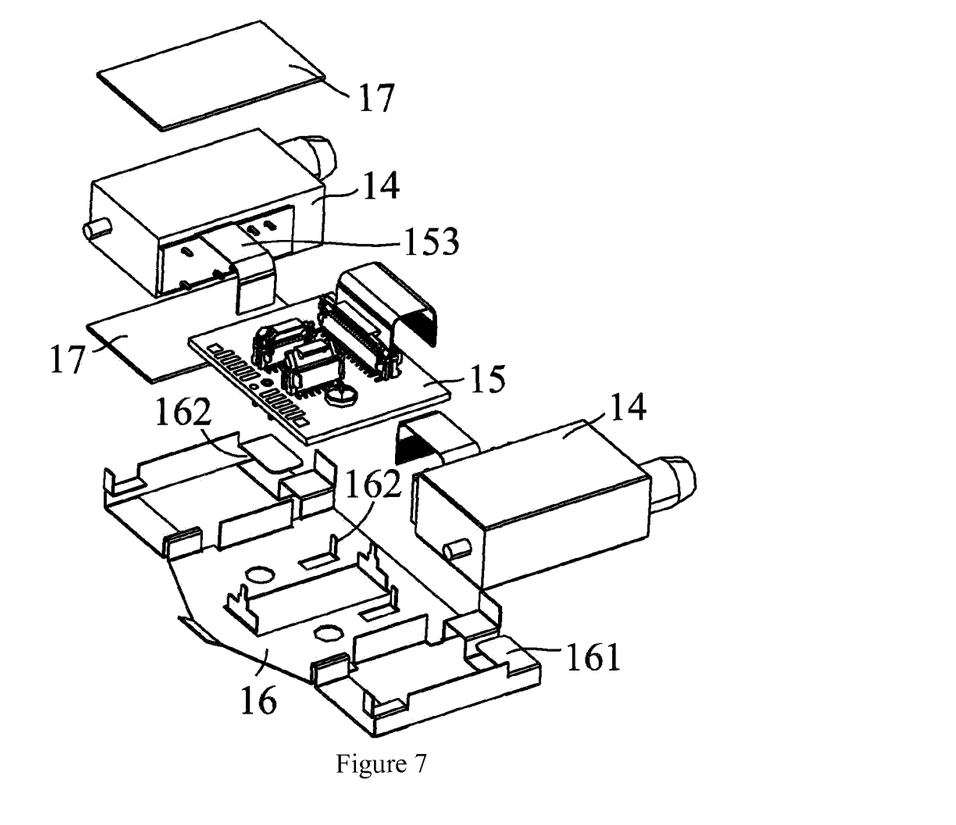
FIG. 7 is an exploded view of the members illustrated in FIG. 6.

A carrying frame 16 is further provided in the device housing 11 of the optical transceiver device 1 according to the invention, for carrying the optical switching switch 14 and switch control substrate 15, and providing fixation for the optical switching switch 14 and switch control substrate 15. The carrying frame 16 further has a cantilever sheet 161 extending to be below the optical switching switch 14. The cantilever sheet 161 extends outside a wall of the carrying frame 16 to form a cantilever beam structure in order for providing elastic support for the optical switching switch 14, and reducing the vibration amplitude of the optical switching switch 14 due to impact of external force, and further preventing the optical switching switch 14 from damaging due to over vibration, and further achieving the effect of increasing the service life of the optical switching switch 14. In addition, the optical switching switch 14 may have a vibration absorbers 17 attached on the wall thereof close to the cantilever sheet 161 and top cover 111 to absorb partial vibration energy of the optical switching switch 14 by means of the vibration absorbing property of the vibration absorbers 17. Said vibration absorber may be a vibration absorption cotton. As such, the effect to increase the service life of the optical switching switch 14 is achievable. The carrying frame 16 may be further formed with a guiding surface 162 for guiding optical fibers delivering optical signal inside the device housing 11 to extend toward a determined direction. As such, the winding process of optical fibers inside the device housing 11 may be simplified.

Figure 8:
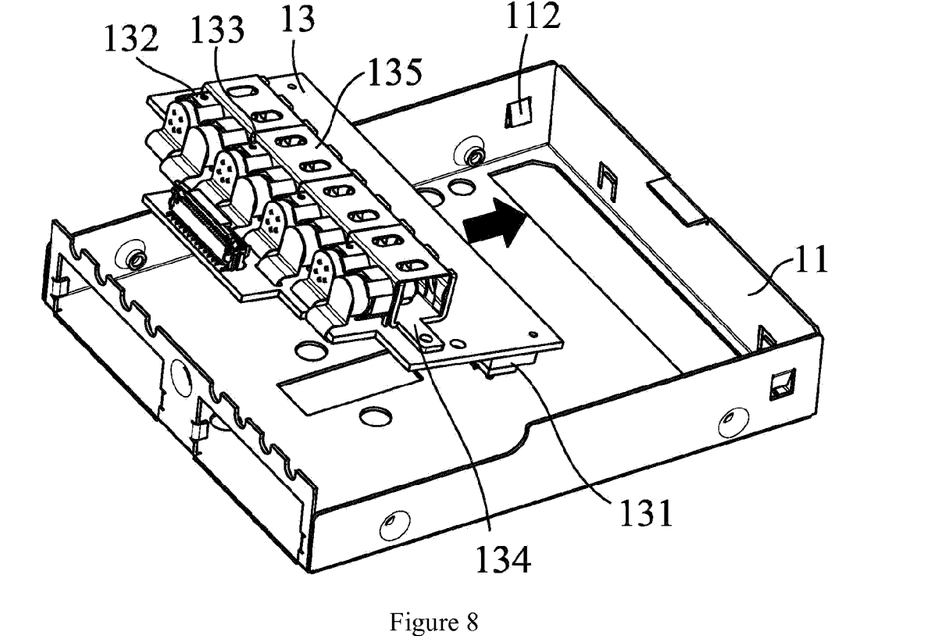
FIGS. 8 to 10 are schematic views of various action steps for insertion of an O/E conversion substrate into the device housing.
Figure 9:
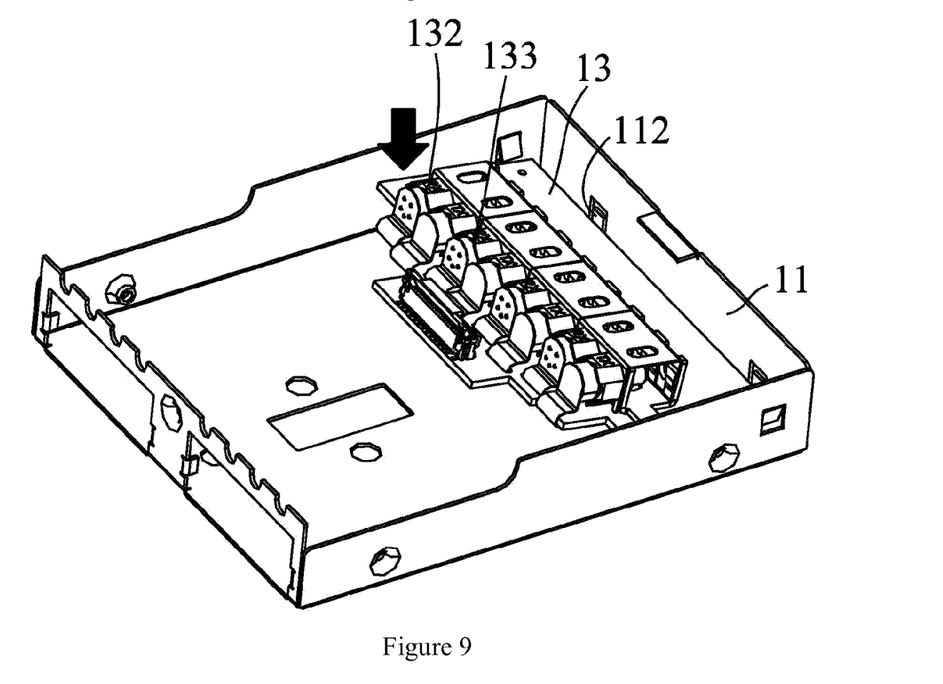
Figure 10:
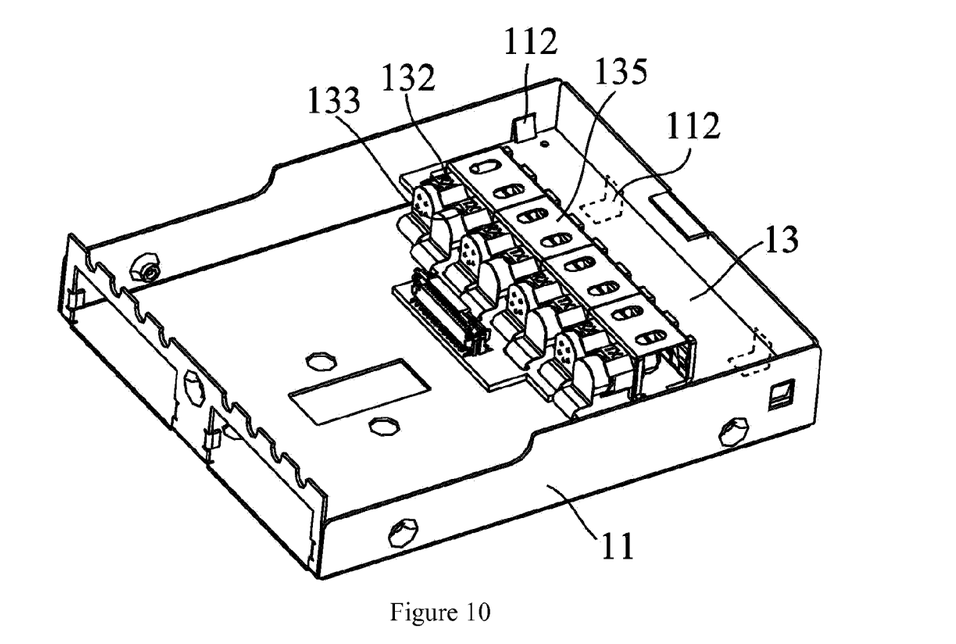

Multiple blade stoppers 112 are protruded separately on an inner wall of the device housing 11 at different height locations for abutting and fixating the O/E conversion substrate 13 at different height locations. The blade stoppers 112 are, for example, tenons or seizing sheets extending toward the interior of the device housing 11. Refer to FIGS. 8 to 10, in order to insert the O/E conversion substrate 13 into the containing space inside the device housing 11, at first, the O/E conversion substrate 13 has to be raised to a height location (the height location allowing for leaving the device housing 11), and then the O/E conversion substrate 13 is inclined toward the blade stoppers 112. Next, the O/E conversion substrate 13 is moved toward the solid arrow indicated in FIG. 8 until the front edge of the O/E conversion substrate 13 abutting the inner wall of the device housing 11. As shown in FIG. 9, subsequently, the O/E conversion substrate 13 is moved toward the direction indicated by the solid arrow in FIG. 9 until the multiple blade stoppers 112 on the inner wall of the device housing 11 at different heights abut separately both the upper and lower sides of the O/E conversion substrate 13. Refer to FIG. 10, at the moment, the fixation of both sides of the O/E conversion substrate 13 is accomplished because of being constrained by each of the blade stoppers 112. The relative location relationship of the device housing 11 and the O/E conversion substrate 13 will not change even though the electrical signal port 131 is under removal from the in-line equipment 4.

Figure 13:
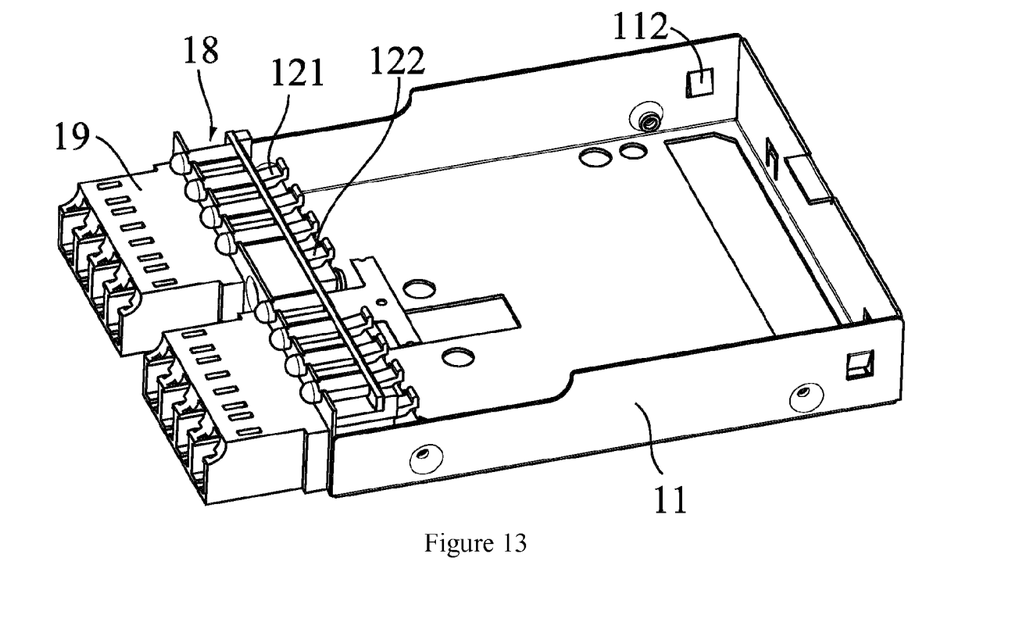
FIG. 13 is an assembly drawing of the optical transceiving component and device housing according to the invention.
Figure 14:
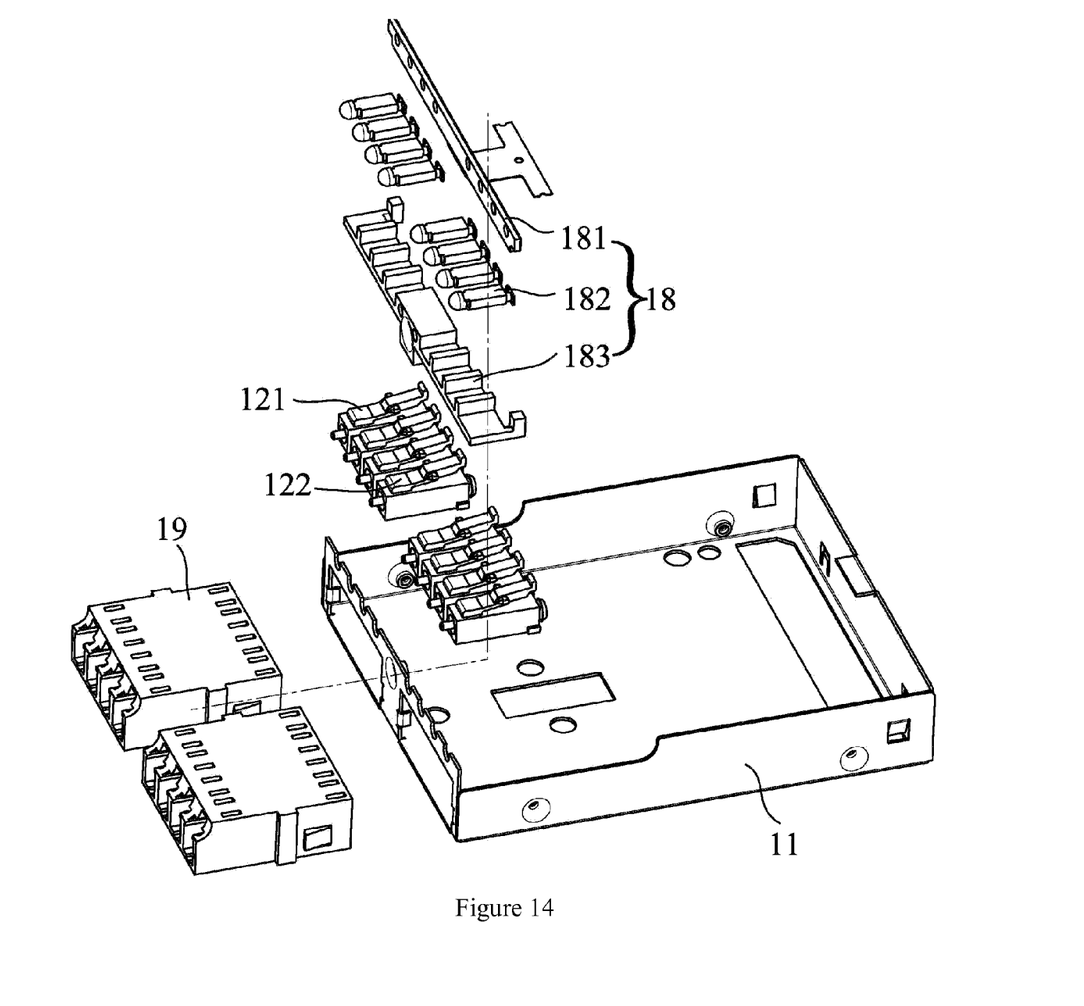
FIG. 14 is an exploded view of the members illustrated in FIG. 13.

The optical transceiver device 1 of the invention further includes an indication lamp 18 and an optical transceiving port socket 19. The indication lamp 18 has a light emitting surface exposed to the device housing 11. The indication lamp 18 further has a light emitting element 181, which may connect electrically with the switch control substrate 15 through a circuit board. The switch control substrate 15 may provide electrical signal to the light emitting element 181 according to the running state of the optical switching switch 14 and/or the first, second O/E converter unit 132, 133, in order to adjust the brightness state of the indication lamp 18, in order to indicate the running state of the optical switching switch 14 and/or the first, second O/E converter unit 132, 133 by means of brightness. In the disclosure of FIG. 13, the optical transceiving port socket 19 is provided at the device housing 11. The first, second optical transceiving port 121, 122 may penetrate and enter the optical transceiving port socket 19 to accomplish fixation. The indication lamp 18 abuts the top of the optical transceiving port socket 19. As such, the top cover 111 may abut the indication lamp 18 as covering over the device housing 11 to provide a longitudinal downward pressure for the indication lamp 18, and further constrain the longitudinal movement of the optical transceiving port socket 19 by the indication lamp 18, such that the optical transceiving port socket 19 will not vibrate easily.

In the first implementation of the optical transceiver device according to the invention, the indication lamp 18 further comprises multiple light guiding pillars 182 and light stoppers 183. The light stoppers 183 may be an opaque material. Each light guiding pillar 182 corresponds to one light emitting element 181 in order to guide the light of the light emitting element 181 to the light emitting surface exposed to the device housing 11. One light stopper 183 is provided between adjacent light guiding pillars 182 to block mutual delivery interference of lights between adjacent light guiding pillars 182 by the light stopper 183, such that the brightness state presented by the indication lamp 18 meets expectation.

Figure 15:
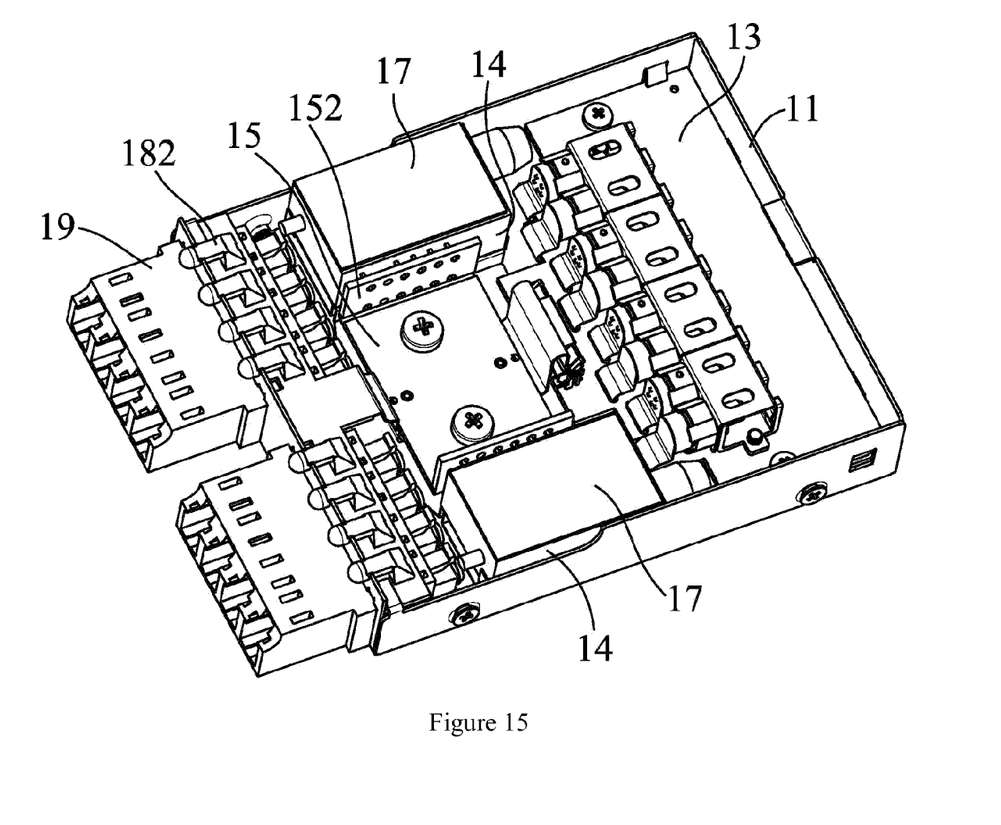
FIG. 15 is a stereogram showing the optical transceiver device of the third implementation according to the invention.

Further refer to FIG. 15, which is a structural view showing the third implementation of the optical transceiver device according to the invention after the device housing is omitted. The switch control substrate 15 is further extended with a circuit flange plate 152 in order to achieve the electrical connection between the switch control substrate 15 and the optical switching switch 14. But, the connected electrically between the switch control substrate 15 and the optical switching switch 14 may further be achieved by a flexible circuit board 153 or other electrical connection manners, refer to FIG. 7.

In summary, the optical transceiver device of the invention has at least the following advantages and features with technically unexpected effects:

1) With mutually separated transmission channels of control signal and electrical signal, the mutual interference of different types of signal transmitted in the same or adjacent channels is avoided.

2) With the structure design of spring clip, the combination of O/E converter unit and O/E conversion substrate is achieved, such that the O/E converter unit does not move easily due to external force and even leave the O/E conversion substrate.

3) The running state of the optical switching switch may be changed according to the state of the in-line equipment to, thereby, guarantee normal communication of the optical fiber network formed by the first and second optical network equipments without suffering from the impact of sudden conditions, such as electrical power loss or machine crash of the in-line equipment.

4) The O/E converter unit and optical switching switch are configured separately on the O/E conversion substrate and switch control substrate. As such, the detection for the O/E converter unit and optical switching switch may be performed separately to perform rapid detection separately whether or not the O/E converter unit and optical switching switch are normal. In addition, redesign of switch control substrate is not necessary if the specification or model of the O/E converter unit is to be changed. Thereby, the design cost of substrates is reduced effectively. Similarly, redesign of O/E conversion substrate is unnecessary if the specification or model of the optical switching switch is to be changed.

The examples above are only illustrative to explain principles and effects of the invention, but not to limit the invention. It will be apparent to those skilled in the art that modifications and variations can be made without departing from the spirit and scope of the invention. Therefore, the protection range of the rights of the invention should be as defined by the appended claims.

What is claimed is:

1. An optical transceiver device for connecting separately a first, a second optical network equipment and an in-line equipment to establish an optical fiber network, and guarantee normal network communication between said first and second optical network equipment, including:
   a device housing;
   an optical transceiving component having a first optical transceiving port and a second optical transceiving port for connecting separately said first, second optical network equipment to perform delivery of optical signal;
   an O/E conversion substrate having an electrical signal port, and a first O/E converter unit and a second O/E converter unit, said electrical signal port being exposed to a first location of said device housing for connecting electrically said in-line equipment for delivery of electrical signal; said first, second O/E converter unit being for converting received optical signal into electrical signal, or converting received electrical signal into optical signal;
   an optical switching switch connecting separately with said first, second optical transceiving port and first, second O/E converter unit; and
   a switch control substrate connecting electrically with said optical switching switch, having a control signal port, said control signal port being exposed to a second location of said device housing for connecting electrically said in-line equipment to receive the control signal of said in-line equipment for said optical switching switch, said switch control substrate causing running state of said optical switching switch to change according to the control signal for said first, second optical transceiving port to communicate separately with the optical signal of said first, second O/E converter unit; or for the optical signal of said first, second optical transceiving port to communicate in a situation without accessing said in-line equipment.

2. The optical transceiver device of claim 1, further including a carrying frame provided in said device housing to carry said optical switching switch and switch control substrate, said carrying frame being extended with a cantilever sheet, said cantilever sheet being extended to be below said optical switching switch to provide elastic support for said optical switching switch; said carrying frame being further formed with a guiding surface in order for guiding an optical fiber delivering optical signal inside said device housing to extend toward a determined direction.

3. The optical transceiver device of claim 2, further including multiple vibration absorbers provided separately on two end surfaces of said optical switching switch toward said cantilever sheet and a top cover of said device housing.

4. The optical transceiver device of claim 1, wherein said switch control substrate is further extended with a circuit flange plate in order to achieve the electrical connection between said switch control substrate and said optical switching switch.

5. The optical transceiver device of claim 1, wherein the electrical connection between said switch control substrate and said optical switching switch is achieved by a flexible circuit board; multiple blade stoppers are protruded separately at different height locations on a inner wall of said device housing for abutting and fixating said O/E conversion substrate.

6. The optical transceiver device of claim 1, further including an indication lamp and an optical transceiving port socket, said indication lamp having a light emitting surface exposed to said device housing to indicate the running state of said optical switching switch and/or said first, second O/E converter unit by brightness; said optical transceiving port socket being provided at said device housing, and said indication lamp abutting said optical transceiving port socket; said first, second optical transceiving port penetrating and entering said optical transceiving port socket to accomplish fixation, the top cover of said device housing abutting said indication lamp to constrain longitudinal movement of said optical transceiving port socket by said indication lamp.

7. The optical transceiver device of claim 6, wherein said switch control substrate is connected electrically with the light emitting element of said indication lamp through a circuit board, in order to provide electrical signal to adjust the brightness state of said indication lamp.

8. The optical transceiver device of claim 7, wherein said indication lamp comprising multiple light guiding pillars and light stoppers, a light stopper is provided between adjacent light guiding pillars to avoid mutual interference of lights between adjacent light guiding pillars by the light stopper.

9. The optical transceiver device of claim 1, wherein said O/E conversion substrate further has a settling frame and a spring clip, said first, second O/E converter unit enter said settling frame separately through the openings of two side walls of said settling frame, one side of said spring clip being contacted said settling frame, the other side of said spring being contacted said first O/E converter unit or second O/E converter unit in order to provide an clamping force for said first O/E converter unit or second O/E converter unit to abut said settling frame.

* * * * *